(12) United States Patent
Yoon

(10) Patent No.: US 10,908,325 B1
(45) Date of Patent: Feb. 2, 2021

(54) LIQUID LENS FOR VARIFOCAL DISPLAY

(71) Applicant: Facebook Technologies, LLC, Menlo Park, CA (US)

(72) Inventor: Youngshik Yoon, Cupertino, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 134 days.

(21) Appl. No.: 15/875,747

(22) Filed: Jan. 19, 2018

(51) Int. Cl.
*G02B 3/14* (2006.01)
*G02B 3/08* (2006.01)
*G02B 5/32* (2006.01)
*G02B 27/01* (2006.01)

(52) U.S. Cl.
CPC ............... *G02B 3/14* (2013.01); *G02B 3/08* (2013.01); *G02B 5/32* (2013.01); *G02B 27/0101* (2013.01); *G02B 27/0103* (2013.01)

(58) Field of Classification Search
CPC ... G02B 3/08; G02B 3/12; G02B 3/14; G02B 27/0179; G02B 2027/0185
USPC .................................................. 359/665–667
See application file for complete search history.

(56) References Cited

U.S. PATENT DOCUMENTS

| | | | | |
|---|---|---|---|---|
| 3,641,354 A | * | 2/1972 | De Ment | G01L 9/0077 250/216 |
| 5,613,022 A | * | 3/1997 | Odhner | G09F 9/375 385/37 |
| 5,774,273 A | * | 6/1998 | Bornhorst | F21V 5/04 359/665 |
| 5,794,023 A | * | 8/1998 | Hobbs | G02B 26/0808 359/565 |
| 6,445,509 B1 | * | 9/2002 | Alden | E06B 9/24 359/666 |
| 6,856,461 B2 | * | 2/2005 | Curtis | G02B 5/1828 359/566 |
| 7,920,330 B2 | * | 4/2011 | Aschwanden | G02B 5/1828 359/665 |
| 8,542,445 B2 | * | 9/2013 | Bolis | G02B 3/14 359/665 |
| 8,605,361 B2 | * | 12/2013 | Batchko | G02B 3/14 359/666 |
| 8,755,124 B2 | * | 6/2014 | Aschwanden | G02B 3/14 359/666 |
| 9,292,973 B2 | * | 3/2016 | Bar-Zeev | G06F 3/012 |
| 9,304,319 B2 | * | 4/2016 | Bar-Zeev | G02B 27/017 |

(Continued)

OTHER PUBLICATIONS

Cu-Nguyen, "Tunable hyperchromatic lenses," Research in Microoptics, vol. 18. (Year: 2015).*

(Continued)

*Primary Examiner* — Nicholas R. Pasko
(74) *Attorney, Agent, or Firm* — Morgan, Lewis & Bockius LLP

(57) ABSTRACT

An adaptive liquid lens includes a membrane, a patterned film in contact with the membrane, a substrate, and a layer of optical fluid encapsulated within the membrane and the substrate. A display device includes the adaptive liquid lens and an electronic display optically coupled with the adaptive liquid lens for outputting light through the adaptive liquid lens toward a pupil of an eye of a user of the display device. Also disclosed is a method including modifying a surface profile of a membrane of an adaptive liquid lens. Modifying the surface profile of the membrane of the adaptive liquid lens changes a focal distance of the adaptive liquid lens.

17 Claims, 13 Drawing Sheets

(56) References Cited

U.S. PATENT DOCUMENTS

| | | | | |
|---|---|---|---|---|
| 9,310,532 B2* | 4/2016 | Park | ............... | G02B 3/08 |
| 9,323,325 B2* | 4/2016 | Perez | ............... | G06F 3/017 |
| 9,588,341 B2* | 3/2017 | Bar-Zeev | ............... | G02B 27/017 |
| 2013/0176608 A1* | 7/2013 | Brokken | ............... | G02B 26/08 |
| | | | | 359/224.1 |
| 2015/0212326 A1* | 7/2015 | Kress | ............... | G02B 3/14 |
| | | | | 349/11 |
| 2016/0004102 A1* | 1/2016 | Nisper | ............... | G02B 27/0172 |
| | | | | 351/158 |
| 2016/0189432 A1* | 6/2016 | Bar-Zeev | ............... | G02B 27/0172 |
| | | | | 345/633 |

OTHER PUBLICATIONS

Guerrero, et al. "Fluidic actuation of an elastomeric grating," Applied Optics, vol. 51, No. 24, 5812-5817. (Year: 2012).*

Cu-Nguyen, "An imaging spectrometer employing tunable hyperchromatic microlenses," Light: Science & Applications, 5, e16058; doi:10.1038/lsa.2016.58 (Year: 2016).*

Cu-Nguyen, et al. "Imprinted DOE on varifocal membrane lens," 2014 International Conference on Optical MEMS and Nanophotonics, pp. 21-22. (Year: 2014).*

Harm, et al. "Dispersion tuning with a varifocal diffractive-refractive hybrid lens," Optics Express, vol. 22, No. 5, pp. 5260-5269. DOI:10.1364/OE.22.005260. (Year: 2014).*

* cited by examiner

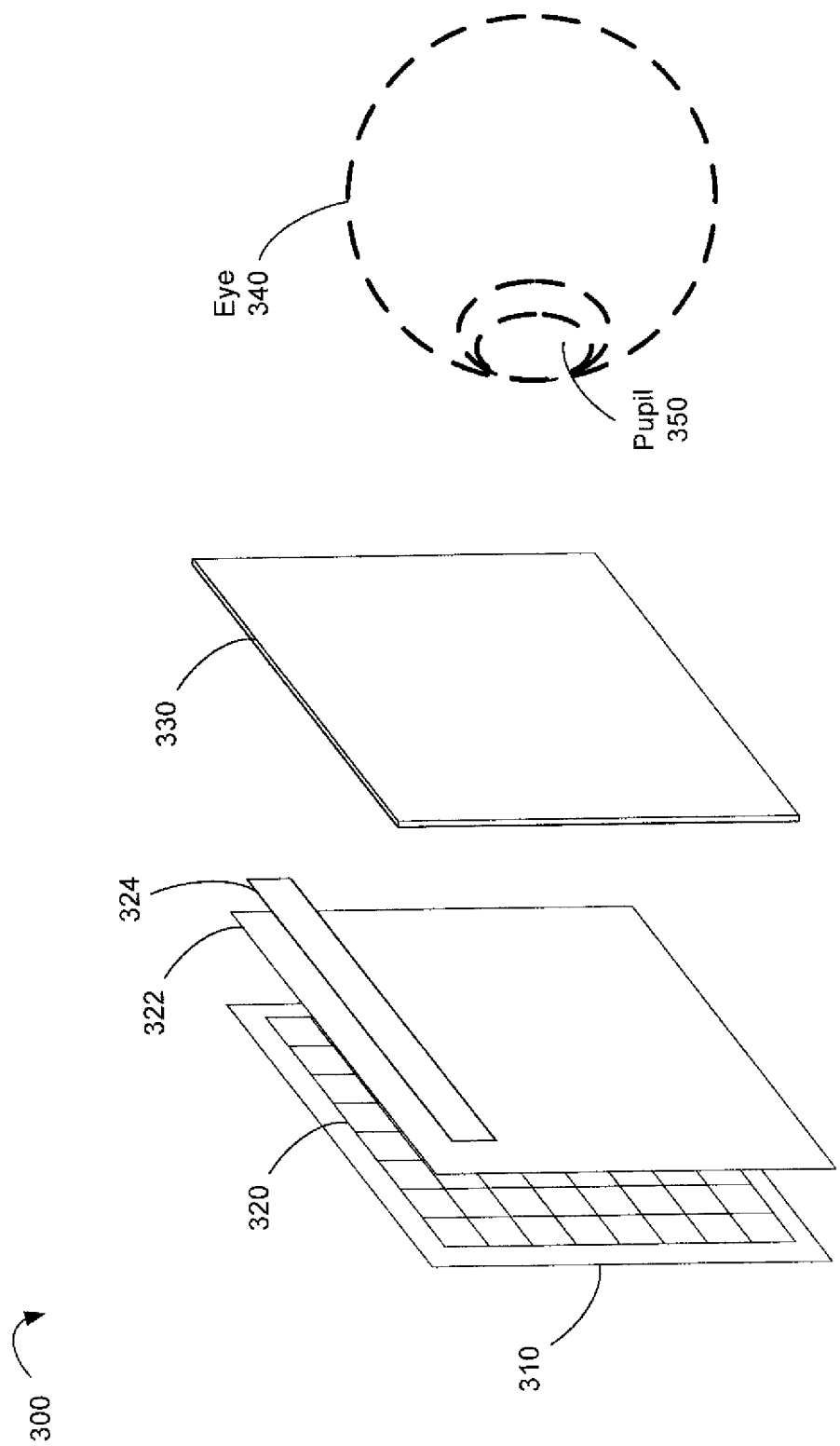

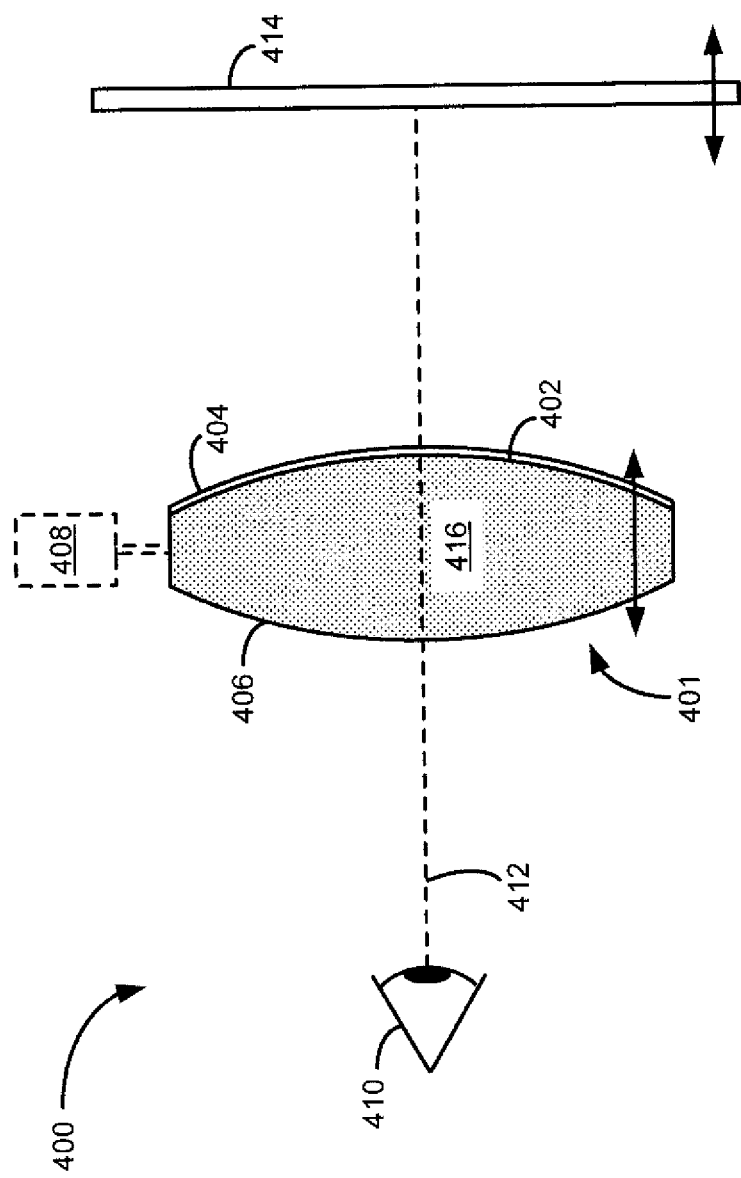

LIQUID LENS FOR VARIFOCAL DISPLAY

TECHNICAL FIELD

This relates generally to optical lenses, and more specifically to optical lenses used in head-mounted display devices.

BACKGROUND

Head-mounted display devices (also called herein head-mounted displays) are gaining popularity as means for providing visual information to user. Virtual reality (VR) and augmented reality (AR) display devices simulate virtual reality environments by projecting computer-generated stereoscopic images to simulate an illusion of depth. Conventional VR and AR display devices are unable to compensate for vergence-accommodation conflicts when displaying images to a user, which may cause discomfort to the user. In order to increase users' comfort, there is a need for head-mounted display devices with varifocal displays and optical components for viewing images projected by the varifocal displays. Furthermore, there is a need for adaptable lenses providing adjustable focal distances while reducing optical aberrations.

SUMMARY

Accordingly, there is a need for focus adjusting head-mounted display devices that increase users' comfort while viewing virtual reality and/or augmented reality content. Such head-mounted display devices may include varifocal displays optically coupled with adaptive lenses that have dynamically adjustable focal distances. The adaptive liquid lenses should have compact size and low weight without compromising required optical performance features (e.g., aperture and/or focal distance). In addition, there is a need for adaptive liquid lenses that reduce optical aberrations, such as the optical distortions that cause a pupil swim effect.

The above deficiencies and other problems associated with conventional adaptive lenses for varifocal displays are reduced or eliminated by the disclosed lens. In some embodiments, the lens is included in a display device. In some embodiments, the device is a head-mounted display device. In some embodiments, the device is portable.

In accordance with some embodiments, an adaptive liquid lens includes a membrane, a patterned film in contact with the membrane, a substrate, and a layer of optical fluid encapsulated within the membrane and the substrate.

In accordance with some embodiments, a display device includes the adaptive liquid lens described above and an electronic display optically coupled with the adaptive liquid lens for outputting light through the adaptive liquid lens toward a pupil of an eye of a user of the display device.

In accordance with some embodiments, a method includes modifying a surface profile of a membrane of an adaptive liquid lens. The adaptive liquid lens includes the membrane, a patterned film in contact with the membrane, a substrate, and a layer of optical fluid encapsulated within the membrane and the substrate. Modifying the surface profile of the membrane of the adaptive liquid lens changes a focal distance of the adaptive liquid lens.

Thus, the disclosed embodiments provide adaptive liquid lenses for head-mounted display devices with varifocal displays.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIG. 4 is a schematic diagram illustrating a display device in accordance with some embodiments.

Figure 1:
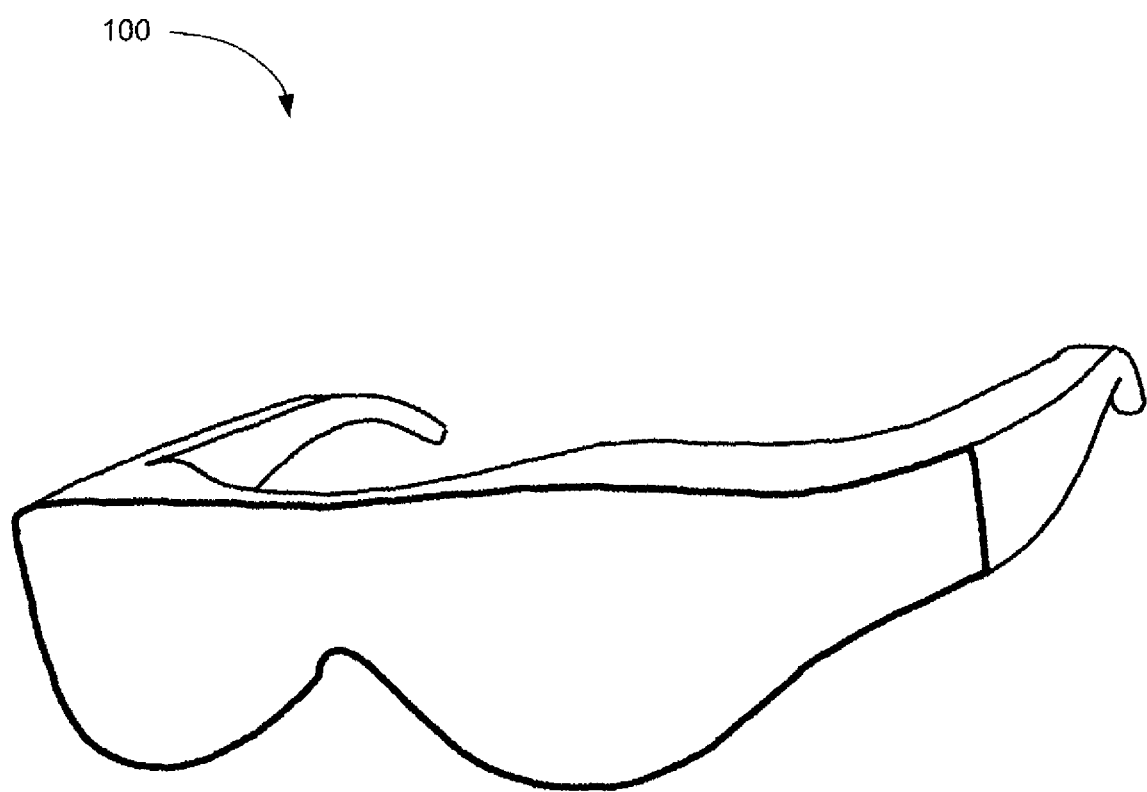
FIG. 1 is a perspective view of a display device in accordance with some embodiments.

These figures are not drawn to scale unless indicated otherwise.

DETAILED DESCRIPTION

Virtual reality (VR) and augmented reality (AR) display devices simulate virtual reality environments by displaying computer-generated stereoscopic images to create an illusion of depth. Conventionally such stereoscopic images are displayed on an electronic display inside a head-mounted display that has a fixed focal distance to an eye of a user. However, such conventional displays do not compensate for vergence-accommodation conflicts. Users' comfort while experiencing a VR or AR environment can be increased by avoiding the occurrence of the vergence-accommodation conflict by a varifocal display and/or optical components that change the distance between a display plane and an eye of a user. Accordingly, there is a need for adaptive lenses with adjustable focal distances for varifocal display devices.

Additionally, there is a need for adaptive lenses that reduce optical aberrations, and especially optical distortions related to the "pupil swim" effect. The pupil swim effect refers to optical distortions in images seen by the user caused by changes in the location of a user's eye as a viewing direction of the eye changes. As the viewing direction changes, the optical distance between the eye of the user and the display plane varies. These changes in the optical distance contribute to distorted images perceived by the user. The adaptive lenses of the present disclosure reduce optical distortions related to the pupil swim effect in varifocal display devices.

Adaptive liquid membrane lenses have desirable properties for varifocal display devices. Adaptive liquid lenses are compact and light. A membrane of an adaptive liquid membrane lens is configured to have a variety of adjustable surface profiles suitable for adjusting the focal distance of the lens. In order to further increase the optical performance of an adaptive liquid membrane lens described herein, the membrane surface of the lens is attached to a patterned film (e.g., a Fresnel film, a holographic Fresnel film or a holographic patterned film). Such patterned film increases the optical power of the adaptive liquid membrane lens.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first surface could be termed a second surface, and, similarly, a second surface could be termed a first surface, without departing from the scope of the various described embodiments. The first surface and the second surface are both surfaces, but they are not the same surfaces.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on the head of a user (e.g., by having the form of spectacles or eyeglasses, as shown in FIG. 1) or to be included as part of a helmet that is worn by the user. When display device 100 is configured to be worn on the head of a user or to be included as part of a helmet, display device 100 is called a head-mounted display. Alternatively, display device 100 is configured for placement in proximity to an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2. In some embodiments, display device 100 includes additional components not shown in FIG. 2.

Figure 2:
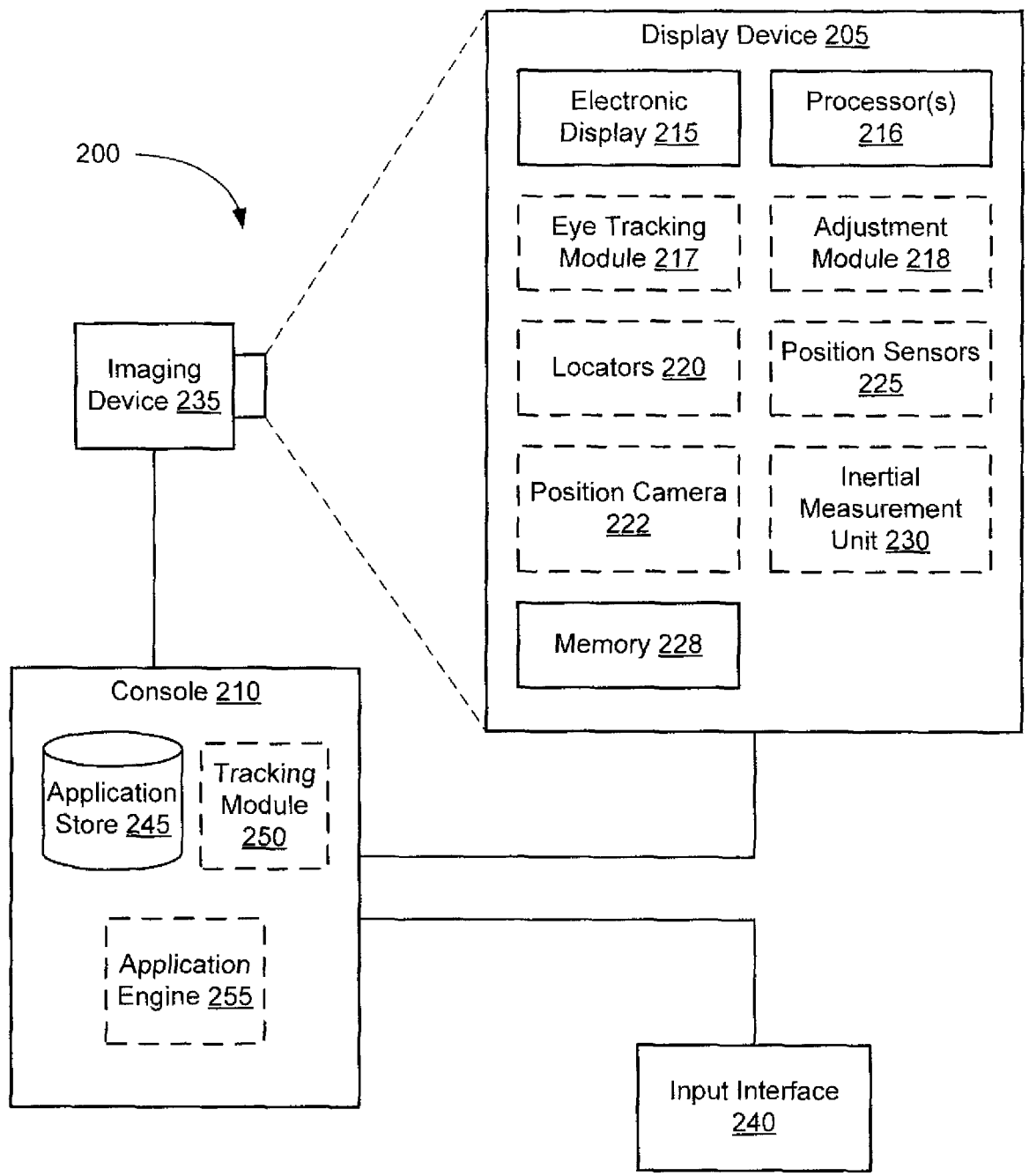
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240, which are each coupled to console 210. While FIG. 2 shows an example of system 200, including one display device 205, imaging device 235, and input interface 240, in other embodiments, any number of these components may be included in system 200. For example, there may be multiple display devices 205 each having an associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described herein can deliver virtual reality, mixed reality, and/or augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 may operate as a virtual reality (VR) device, an AR device, as glasses, or as some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, a laser, a fluorescent light source, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximal to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps receive signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR system described above.

Adjustment module 218 generates an image frame based on the determined locations of the pupils. In some embodiments, this sends a discrete image to the display that will tile subimages together, such that a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough not to substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

Inertial Measurement Unit (IMU) 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device

205. For example, position sensors 225 include multiple accelerometers to measure translational motion (forward/back, up/down, left/right) and multiple gyroscopes to measure rotational motion (e.g., pitch, yaw, roll). In some embodiments, IMU 230 samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so that it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Optionally, imaging device 235 is configured to detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal distance, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, a touch controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, educational applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., digital microscope, a mobile device, a smartphone etc.). In some embodiments, display device 300 includes light emission device array 310, and one or more lenses 330. In some embodiments, display device 300 also includes emission intensity array 322 and IR detector array 324.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

Emission intensity array 322 is configured to selectively attenuate light emitted from light emission array 310. In some embodiments, emission intensity array 322 is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation and/or at some intermediate level of attenuation. In this manner, emission intensity array 322 is able to control what portion of the image light emitted from light emission device array 310 is passed to the one or more lenses 330. In some embodiments, display device 300 uses emission intensity array 322 to facilitate providing image light to a location of pupil 350 of eye 340 of a user and to minimize the amount of image light provided to other areas in the eyebox.

One or more lenses 330 receive the modified image light (e.g., attenuated light) from emission intensity array 322 (or directly from emission device array 310), and direct the shifted image light to a location of pupil 350.

Optional IR detector array 324 detects IR light that has been retro-reflected from the retina of eye 340, a cornea of eye 340, a crystalline lens of eye 340, or some combination thereof. IR detector array 324 includes either a single IR sensor or a plurality of IR sensitive detectors (e.g., photodiodes). In some embodiments, JR detector array 324 is separate from light emission device array 310. In some embodiments, IR detector array 324 is integrated into light emission device array 310.

In some embodiments, light emission device array 310 and emission intensity array 322 make up a display element. Alternatively, the display element includes light emission device array 310 (e.g., when light emission device array 310 includes individually adjustable pixels) without emission intensity array 322. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

FIG. 4 is a schematic diagram illustrating display device 400 in accordance with some embodiments. Display device 400 includes display 414 and lens 401 optically coupled with display 414. Display 414 corresponds to electronic display 215 described above with respect to FIG. 2. In some embodiments, display 414 is a varifocal display that has an adjustable position at least with respect to pupil 410 (e.g., an pupil of an eye of a user of display device 400) and adaptive liquid lens 401. For example, display 414 can be moved closer or further away from pupil 410. Display 414 is configured to project image light (e.g., ray 412) for rendering computer-generated images with VR or AR content. Varifocal display 414 projects ray 412 through lens 401 toward pupil 410.

Lens 401 is an adaptive liquid lens, and includes substrate 406, membrane 402, patterned film 404 in contact with membrane 402, and fluid 416 encapsulated within a space defined between substrate 406 and membrane 402. In some embodiments, lens 401 corresponds to lens 330 described above with respect to FIG. 3. Lens 401 is configured to receive ray 412 projected by display 414, and transmit ray 412 toward pupil 410. Substrate 406 faces pupil 410, and membrane 402 with patterned film 404 faces display 414. Substrate 406 is made of an optically transparent rigid material (e.g., glass or plastic). Substrate 406 has a convex surface profile. In some embodiments, substrate 406 has a flat surface profile or other curved surface profile (e.g., a spherical, an aspherical, a parabolic, an ellipsoidal, or a concave surface profile). Membrane 402 is made of an optically transparent flexible material. In some embodiments, membrane 402 is made of an elastomer, such as a polymer or a silicone. In FIG. 4, membrane 402 has a convex surface profile. In some embodiments, membrane 402 has a curved surface profile (e.g., a convex, a spherical, an aspherical, a parabolic, or an ellipsoidal surface profile). A focal distance of lens 401 is configured to be adjusted by modifying the surface profile of membrane 402 and/or thickness of lens 401. In some embodiments, the surface profile and/or thickness of lens 401 is modified by changing the volume of fluid 416. For example, as varifocal display 414 is moved to a distance closer to lens 401 and pupil 412, the focal distance of lens 401 is shortened by adjusting the surface profile of membrane 402 and/or volume of fluid 416, thereby modifying the shape of lens 401. In some embodiments, modifying the surface profile of membrane 402 is done by increasing or decreasing the volume of fluid 416. In some embodiments, modifying the surface profile of membrane 402 is done by increasing or decreasing the pressure of fluid 416 that is encapsulated within membrane 402 and substrate 406. For example, the pressure of fluid 416 is changed by mechanically reducing the thickness of lens 401 on the edges of lens 401. Modifying the volume and/or pressure causes the elastomeric membrane 402 to change its surface profile (e.g., membrane 402 stretches or retracts). In some embodiments, membrane 402 has a uniform thickness and/or a uniform elastomericity across its surface profile. For example, increasing the volume of fluid 416 causes membrane 402 to expand uniformly so that the radius of curvature of its convex surface profile decreases. In some embodiments, membrane 402 has a non-uniform thickness and/or non-uniform elastomericity across its surface profile. For example, increasing the volume of fluid 416 causes membrane 402 to expand so that the surface profile of membrane 402 changes its basic shape. For example, the surface profile of membrane 402 changes from a convex surface profile to an aspheric surface profile. In some embodiments, lens 401 further includes a seal for physically attaching membrane 402 to substrate 406. In some embodiments, lens 401 is physically coupled with container 408 in order to control the volume of fluid 416. In some embodiments, container includes, or is coupled with, actuation mechanisms (e.g., by a syringe, a motor pump, piezoelectric pumping, artificial muscle, a voice coil motor, or any combination thereof). In some embodiments, lens 401 has an adjustable position with respect to display 414. For example, lens 401 can be moved closer or further away from display 414.

Lens 401 also includes patterned film 404, which is in contact with membrane 402. In some embodiments, patterned film 404 is partially or fully embedded in membrane 402. Patterned 404 film is made of an optically transparent material with at least some flexibility, so that the surface profile patterned film 404 remains compatible with the surface profile of membrane 402 as the surface profile of membrane 402 is modified.

Figure 5A:
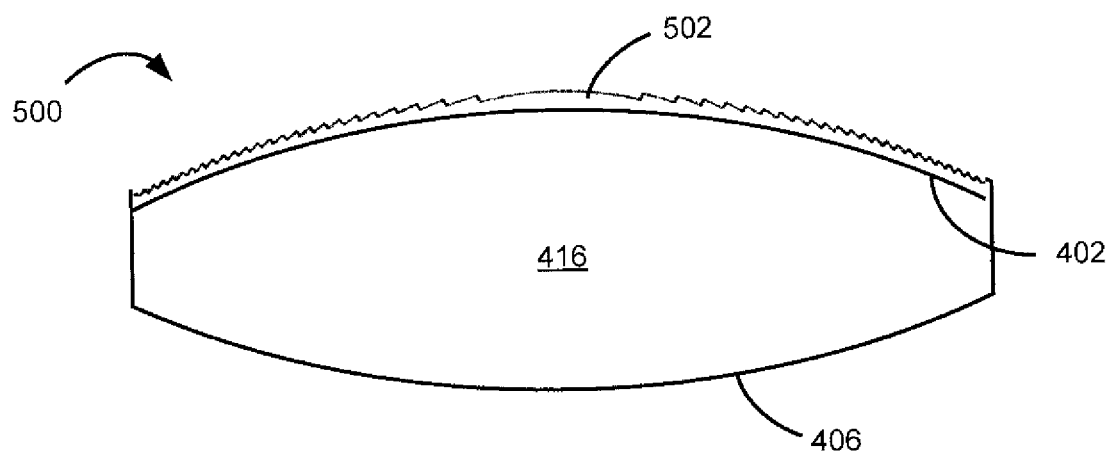
FIG. 5A is a schematic diagram illustrating a lens in accordance with some embodiments.

FIG. 5A is a schematic diagram illustrating lens 500 in accordance with some embodiments. Lens 500 is an adaptive liquid lens corresponding to lens 401 described above with respect to FIG. 4, expect that patterned film 404 includes Fresnel film 502 embedded in membrane 402. Fresnel film 502 has a Fresnel surface including a plurality of Fresnel structures. Fresnel surfaces typically have multiple concentric annular sections that are offset from one another (e.g., for a circular lens). Fresnel lenses provide apertures and focal distances comparable to conventional lens surfaces, and Fresnel lenses are typically thinner and lighter than conventional lenses of similar performance features (e.g., aperture and/or focal distance). Replacing conventional adaptive liquid lenses in head-mounted displays with liquid lenses with Fresnel film can reduce the size and weight of the head-mounted displays.

Figure 5B:
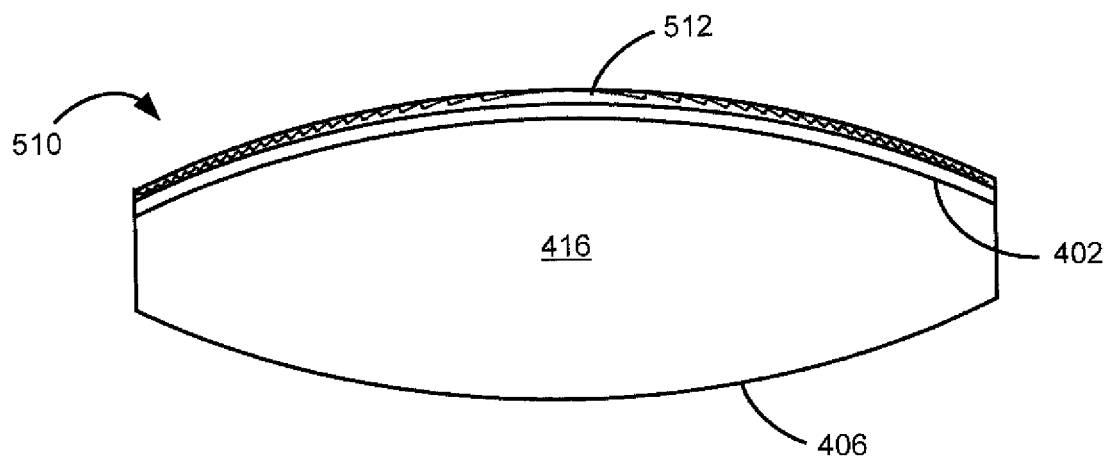
FIG. 5B is a schematic diagram illustrating a lens in accordance with some embodiments.

FIG. 5B is a schematic diagram illustrating lens 510 in accordance with some embodiments. Lens 510 is an adaptive liquid lens corresponding to lens 500 described above with respect to FIG. 5A, expect that that in lens 510, Fresnel film 502 is replaced with holographic Fresnel film 512. In some embodiments, holographic Fresnel film 512 is made of a photosensitive resin. In some embodiments, the photosensitive resin is polycarbonate or poly(methy methacrylate). Holographic Fresnel films provide apertures and focal distances comparable to structured Fresnel films (e.g., Fresnel film 502 in FIG. 5A), but with a thinner surface profile, and thereby with a reduced film thickness. A thin surface profile can be desirable for lens surfaces with adjustable curvature, such as adaptive liquid membrane lenses (e.g., lens 510).

Figure 5C:
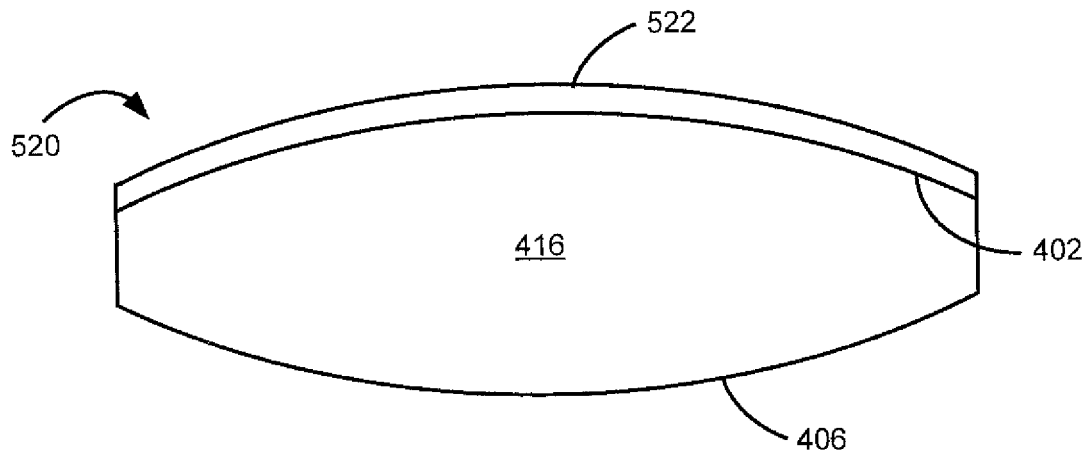
FIG. 5C is a schematic diagram illustrating a lens in accordance with some embodiments.

FIG. 5C is a schematic diagram illustrating lens 520 in accordance with some embodiments. Lens 520 is an adaptive liquid lens corresponding to lens 510 described above with respect to FIG. 5B, expect that holographic Fresnel film 512 is replaced with holographic film 522. Holographic film 522 includes any optical pattern that also provides additional optical power to a liquid lens. In some embodiments, the optical power provided by holographic film 522 is comparable to the optical power provided by Fresnel film 502 and/or holographic Fresnel film 512.

Figure 5D:
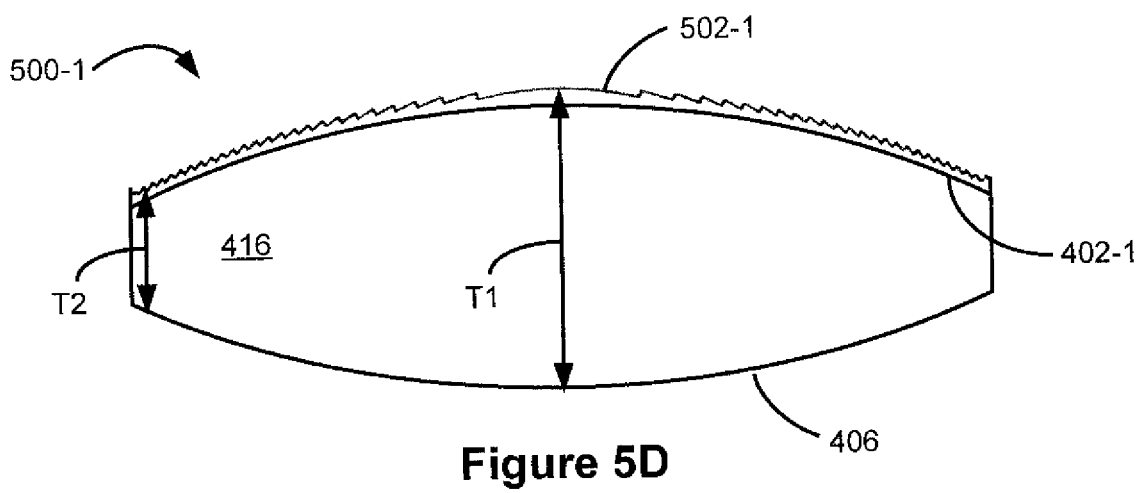
FIGS. 5D-5F are schematic diagrams illustrating a lens with different surface profiles in accordance with some embodiments.
Figure 5E:
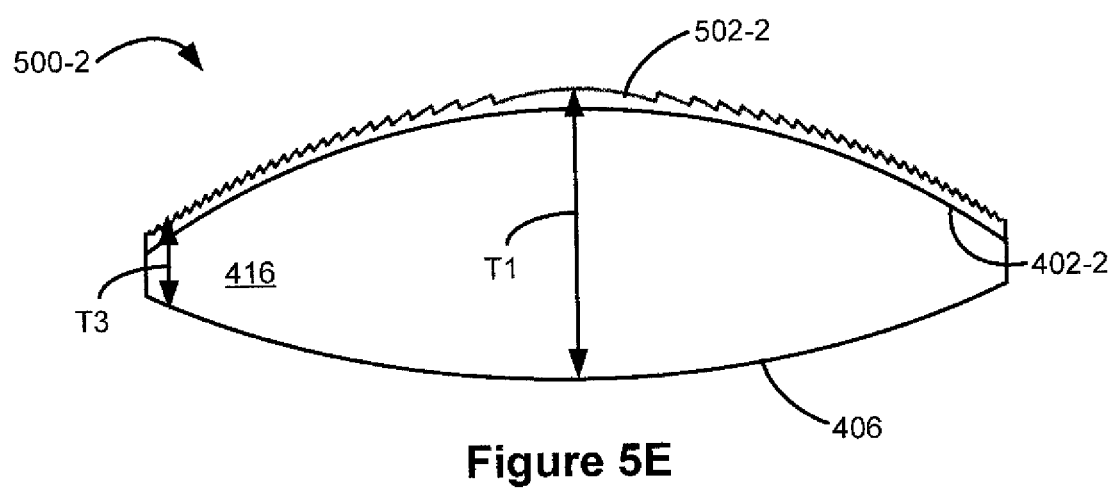
Figure 5F:
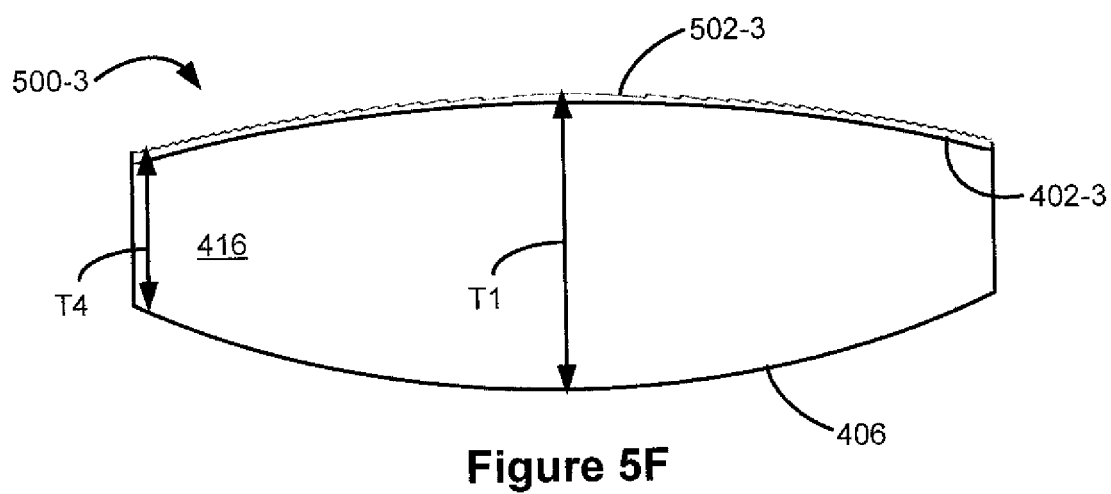

FIGS. 5D-5F are schematic diagrams illustrating lens 500 with different surface profiles in accordance with some embodiments. As described above with respect to FIG. 4, membrane 402 has a curved surface profile (e.g., a convex, a spherical, an aspherical, a parabolic, or an ellipsoidal surface profile). In some embodiments, modifying the surface profile of membrane 402 includes modifying the radius of curvature of membrane 402 (e.g., increasing or decreasing the radius of curvature of membrane 402). In some embodiments, modifying the surface profile of membrane 402 includes modifying the radius of curvature of an aspheric lens. In some embodiments, modifying the surface profile of membrane 402 includes changing the surface profile from a spherical surface profile to an aspheric surface profile, or vice versa. Similarly, in some embodiments, modifying the surface profile of membrane 402 includes changing the surface profile from any surface profile to another surface profile.

FIG. 5D illustrates lens 500-1, including membrane 402-1 with a first curvature. Consequently, Fresnel film 502-1 also has the first curvature as Fresnel film 502-2 is in contact with membrane 402-1. Fresnel lens 500-1 with membrane 402-1 defines a first focal distance. For example, the first focal distance corresponds to an average distance between lens 401 and varifocal display 414 illustrated in FIG. 4. In FIG. 5D, Fresnel lens 500-1 with membrane 402-1 with the first curvature has central thickness TL. Central thickness T1 is defined as a distance between substrate 406 and Fresnel film 502-1 along an optical axis of lens 500-1. Fresnel lens 500-1 with membrane 402-1 with the first curvature has a peripheral thickness T2, defined as a distance between substrate 406 and Fresnel film 502-1 near or at the edge of lens 500-1. Since membrane 402-1 has a convex surface profile, central thickness T1 is greater than peripheral thickness T2.

FIG. 5E illustrates lens 500-2 with membrane 402-2 with a second curvature. Consequently, Fresnel film 502-2 also has the second curvature. Lens 500-2 includes a lower volume of fluid 416 than lens 500-1 illustrated in FIG. 5D. Fresnel lens 500-2 with membrane 402-2 with the second curvature defines a second focal distance, which is shorter than the focal distance of Fresnel lens 500-1, because membrane 402-2 has a shorter radius of curvature than membrane 402-1 of lens 500-1. For example, the second focal distance corresponds to a distance between lens 401 and varifocal display 414, illustrated in FIG. 4, when display 414 is moved closer to lens 401 than its original position corresponding to the first focal distance. As shown in FIG. 5E, lens 500-2 has the same central thickness T1 as lens 500-1, but the peripheral thickness of lens 500-2 is T3, where peripheral thickness T3 is smaller than peripheral thickness T2 of lens 500-1.

FIG. 5F illustrates lens 500-3 with membrane 402-3 with a third curvature. Consequently, Fresnel film 502-3 also has the third curvature. Lens 500-3 has a higher volume of fluid 416 than lens 500-1 illustrated in FIG. 5D. Lens 500-3 with membrane 402-3 with the third curvature defines a third focal distance, which is longer than the first focal distance of lens 500-1, because membrane 402-3 has a longer radius of curvature than membrane 402-1 of lens 500-1. For example, the third focal distance corresponds to a distance between lens 401 and varifocal display 414, illustrated in FIG. 4, when display 414 is moved further away from lens 401 from its original position corresponding to the first focal distance. As shown in FIG. 5F, lens 500-3 has the same central thickness T1 as lens 500-1, but the peripheral thickness of lens 500-2 is T4, where peripheral thickness T4 is larger than peripheral thickness T2 of lens 500-1.

Figure 5G:
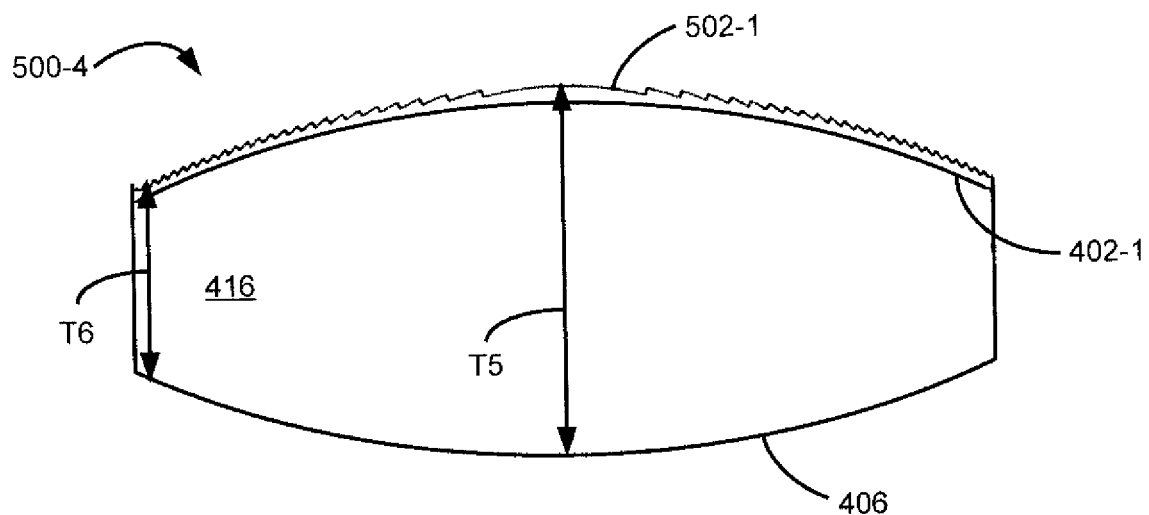
FIGS. 5G-5H are schematic diagrams illustrating a lens with different thicknesses in accordance with some embodiments.
Figure 5H:
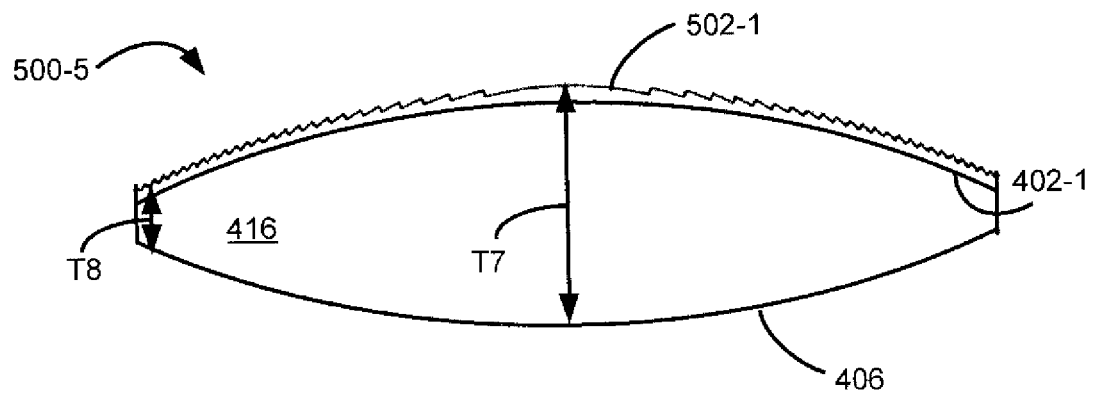

FIGS. 5G-5H are schematic diagrams illustrating lens 500 with different thicknesses in accordance with some embodiments. In some embodiments, the focal distance of lens 500 is adjusted by changing the thickness of lens 500 instead of the curvature of lens 500. FIG. 5G illustrates lens 500-4. Lens 500-4 corresponds to lens 500-1 including membrane 402-1 with the first curvature, except that the overall thickness of lens 500-4 is larger than the overall thickness of lens 500-1. Central thickness T5 of lens 500-4 is larger than central thickness T1 of lens 500-1, and peripheral thickness T6 of lens 500-4 is also larger than peripheral thickness T2 of lens 500-1. Lens 500-4 with membrane 402-1 defines a fourth focal distance, which is shorter than the first focal distance of lens 500-1, because lens 500-4 has a higher volume of fluid 416 than lens 500-1, thereby increasing the optical power. FIG. 5H illustrates lens 500-5. Lens 500-5 corresponds to lens 500-1 including membrane 402-1 with the first curvature, except that the overall thickness of lens 500-5 is smaller than the overall thickness of lens 500-1. Central thickness T7 of lens 500-5 is smaller than central thickness T1 of lens 500-1, and peripheral thickness T8 of lens 500-5 is also smaller than peripheral thickness T2 of lens 500-1. Lens 500-5 with membrane 402-1 defines a fifth focal distance, which is longer than the first focal distance of lens 500-1, because lens 500-5 has a smaller volume of fluid 416 than lens 500-1, thereby decreasing the optical power.

Figure 6A:
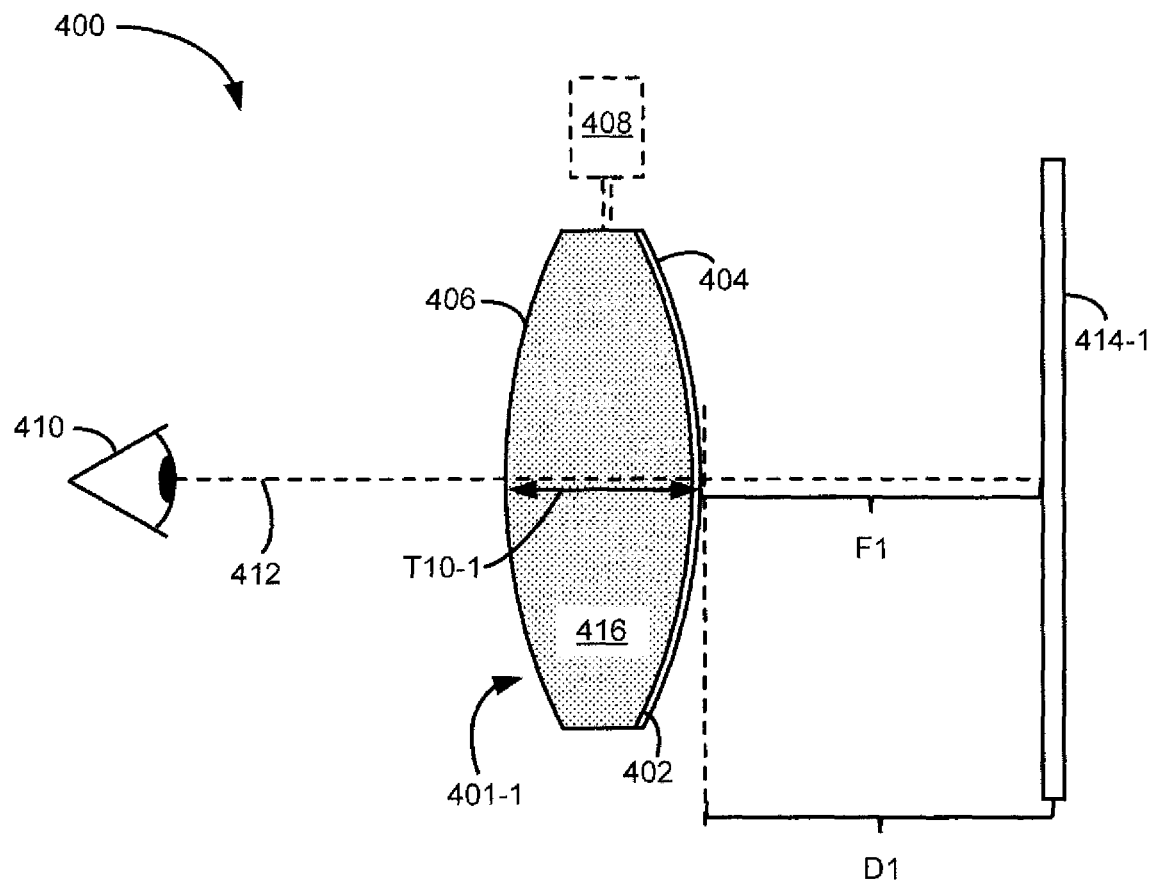
FIGS. 6A-6D are schematic diagrams illustrating a method of adjusting a focal distance of a lens in accordance with some embodiments.
Figure 6B:
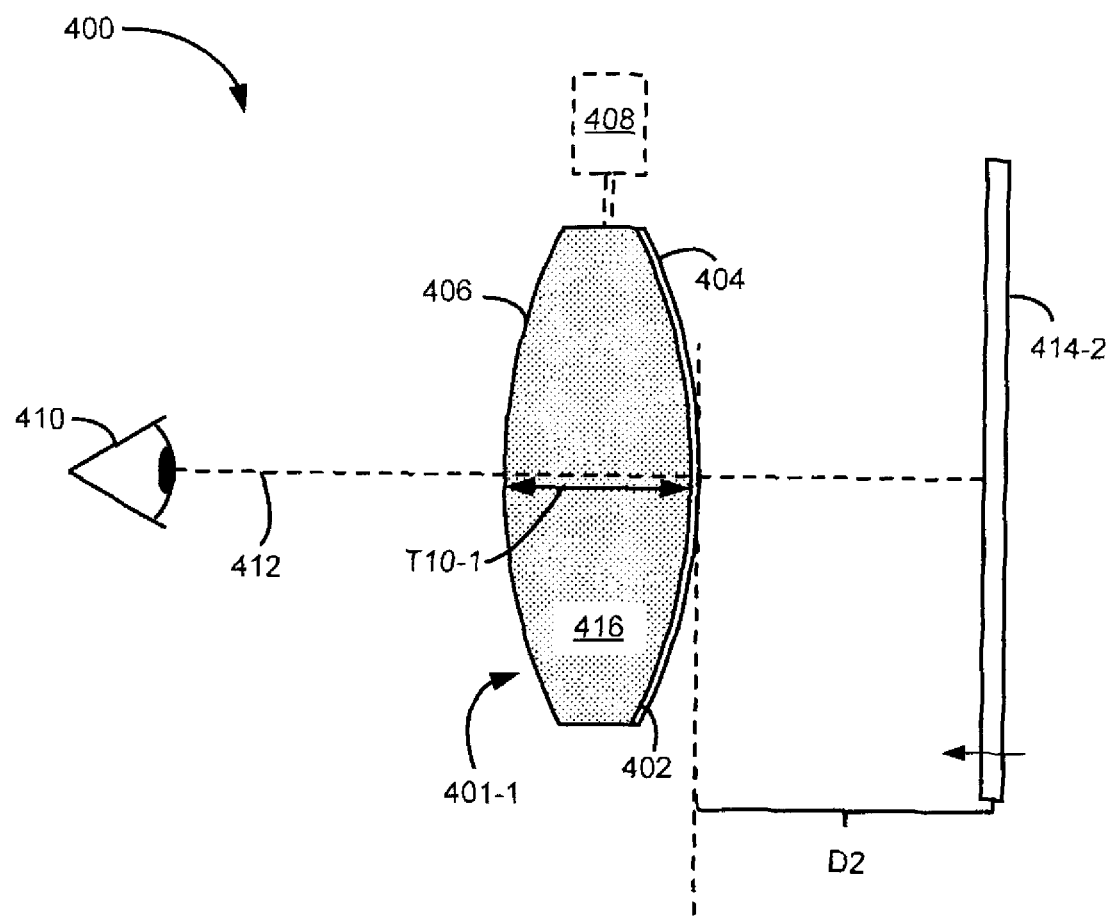
Figure 6C:
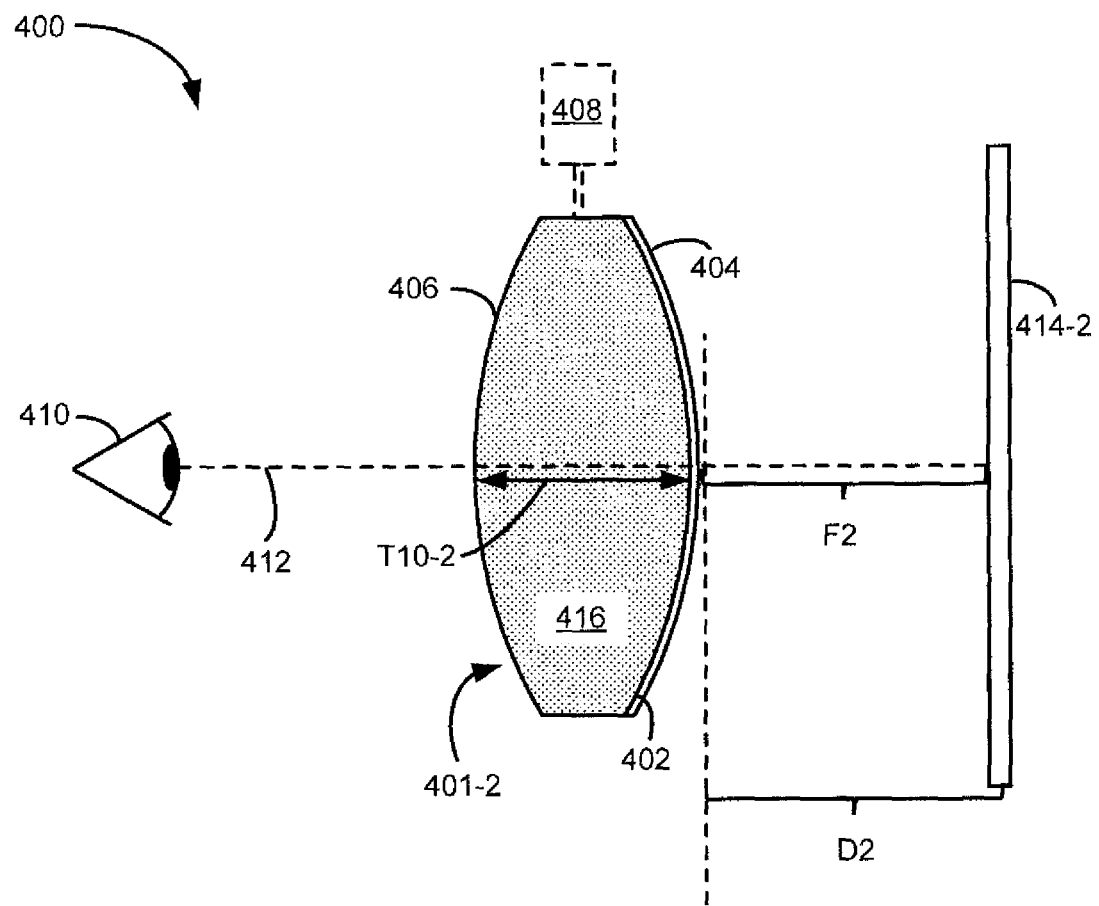

FIGS. 6A-6D are schematic diagrams illustrating a method of adjusting a focal distance of lens 401 in accordance with some embodiments. FIG. 6A illustrates display device 400 with display 414-1 at a first display position at distance D1 from the outermost surface of patterned film 404 of lens 414-1. Lens 414-1 in FIG. 6A has central thickness T10-1 and focal distance F1, which corresponds to distance D1. In FIG. 6B, display 412-2 has moved to a second display position, which is closer to lens 401-1 and pupil 410. The distance between display 412-2 and the outermost surface of patterned film 404 of lens 414-1 corresponds to distance D2, where distance D2 is shorter than distance D1. As display 414-2 is at a shorter distance from lens 401-1, image light (e.g., ray 412) projected by display 414-2 to pupil 410 may appear to be off-focus, as perceived by a user of display device 400, and the focal distance of lens 401-1 will require adjustment. FIG. 6C illustrates display device 400 with lens 401-2 after adjustment of its focal length. In FIG. 6C, lens 401-2 has central thickness T10-2, which is greater than central thickness T10-1 of lens 401-1 in FIG. 6B. Lens 401-1 has focal distance F2 corresponding to distance D2 between display 414-2 at the second display position and the outermost surface of patterned film 404 of lens 401-2. For example, the central thickness of lens 401-2 has been increased by increasing volume of fluid 416 (e.g., by addition of fluid 416 from container 408). In FIG. 6C, the surface profile of membrane 402 remains the same (e.g., membrane 402 has a convex surface profile). In some embodiments, the adjustment of the focal distance is achieved by changing a surface profile (e.g., by changing the radius of curvature as described above with respect to FIG. 5A-5C) of membrane 402. In some embodiments, the adjustment of the focal distance is achieved by increasing a pressure of fluid 416 (e.g., by changing the pressure of fluid 416 by mechanical means). Due to the adjustment of the focal distance of lens 401-2, focal distance F2 corresponds to distance D2, and image light projected by display 414-2 to pupil 410 appears to be in focus, as perceived by a user of display device 400. Images projected by display device 414-2 are perceived to be closer to the user in FIG. 6C, as display 414-2 is closer to the user in FIG. 6C compared to display 414-1 in FIG. 6A.

Figure 6D:
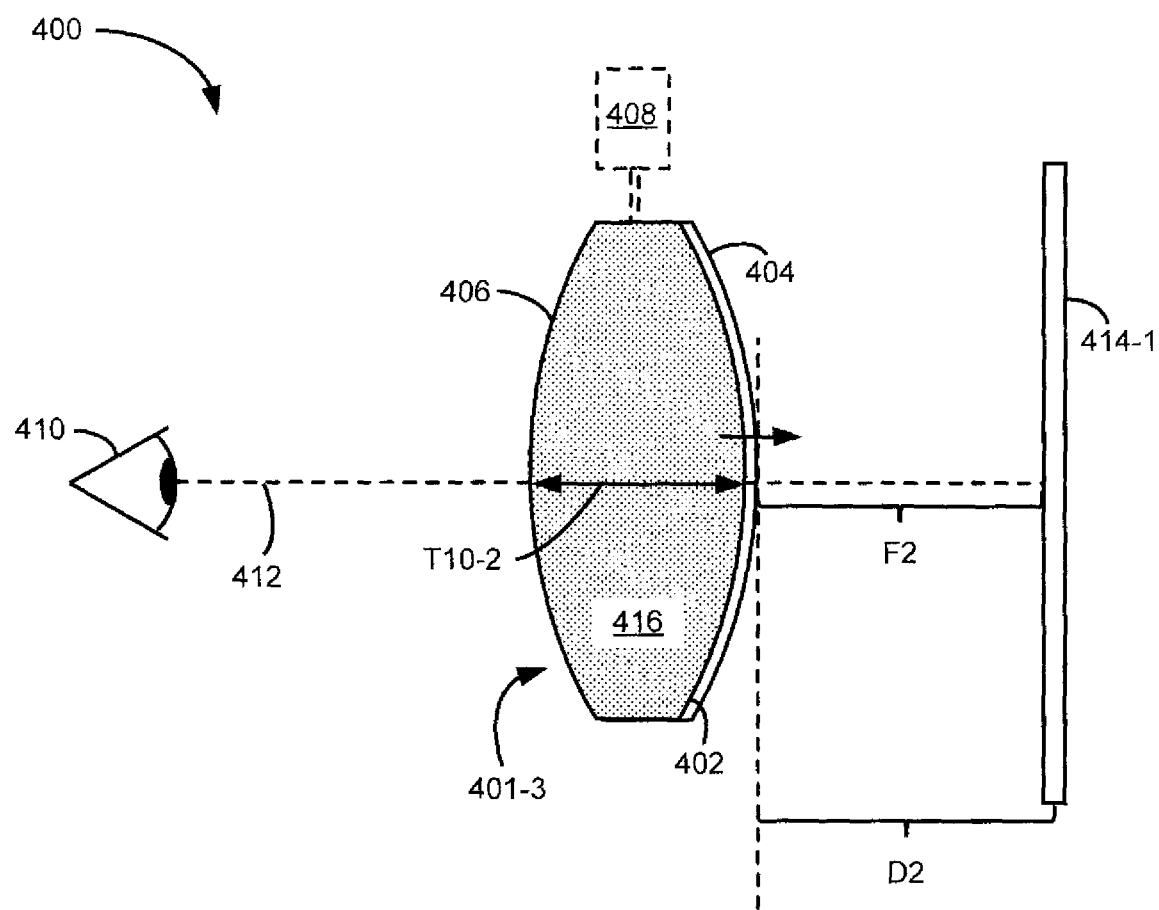

In some embodiments, the varifocal effect of perceiving objects at variable distance is achieved by moving the position of lens 401 instead of moving the position of display 414. In FIG. 6D, display 414-1 is at the first display position, as illustrated in FIG. 6A. Instead, lens 401-3 of FIG. 6A has been modified to have central thickness T10-2 (same as in FIG. 6C) thereby changing the focal distance from F1 in FIG. 6A to focal distance F2. Consequently, the position of lens 401-3 has been moved from a first lens position to a second lens position, which is closer to display device 414-1, so that distance D2, defined as a distance between display 414-1 and the outermost surface of patterned film 404 of lens 401-3, corresponds to focal distance F2. By changing the focal distance and the position of lens 401-3 with respect to display 414-1, the optical path between display 414-1 and pupil 410 is increased. In some cases, an increased optical path between displayed objects (e.g., images projected by display 414-1) and a pupil of an eye of a user causes a perception that the displayed objects are closer to the user.

In some embodiments, the focal distance of lens 401 is adjusted to correct for optical distortions in images projected by display 414 toward pupil 410, as pupil 410 rotates to a different gaze direction. In some embodiments, adaptive liquid membrane lenses (e.g., lens 401 described above with respect to FIG. 4) are useful for reducing optical aberrations, and especially optical distortions related to the "pupil swim" effect. As discussed above, pupil swim refers to optical distortions in images seen by the user caused by changes in the location of a user's eye as the viewing direction of the eye changes. As the viewing direction changes, the optical distance between the eye of the user and the display plane varies. The changes in the optical distance contribute to distorted images being perceived by the user.

Figure 6E:
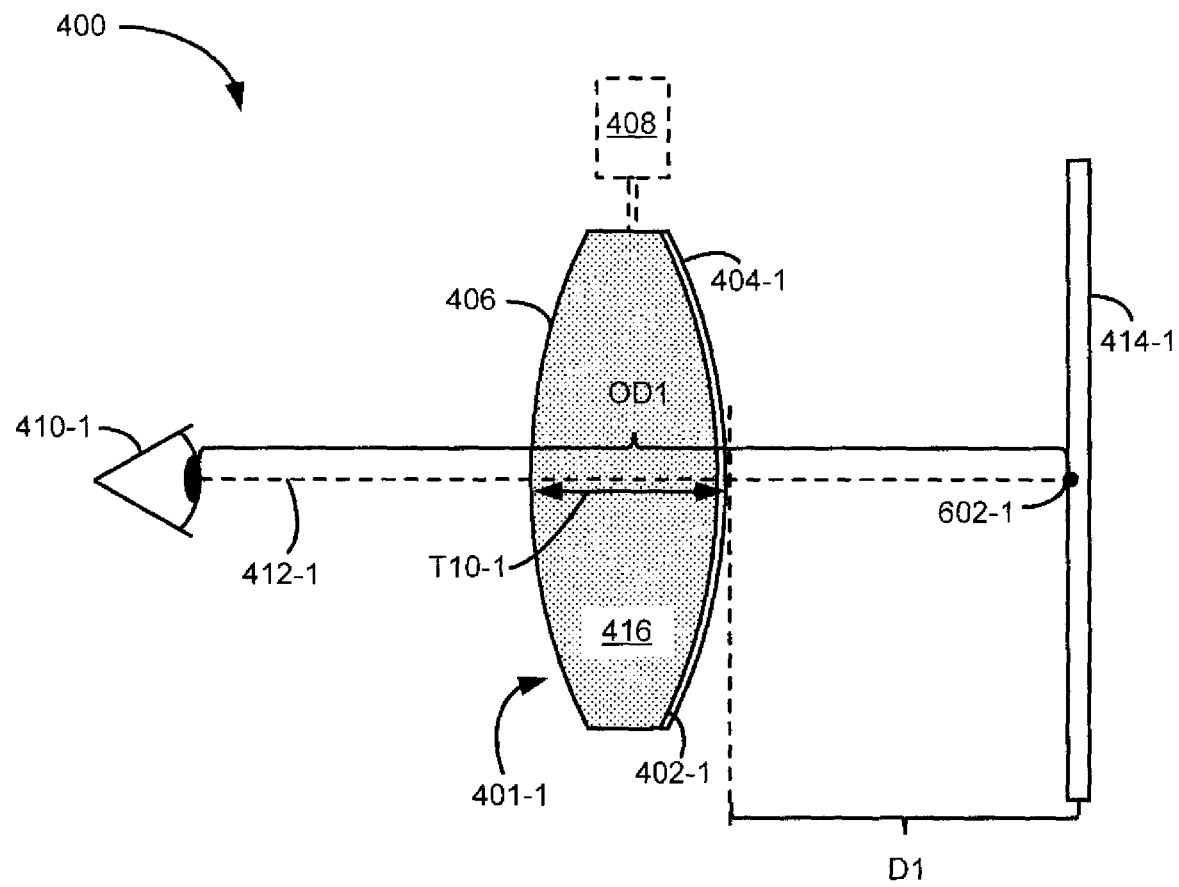
FIGS. 6E-6F are schematic diagrams illustrating adjusting a surface profile of lens for reducing optical distortions in accordance with some embodiments.
Figure 6F:
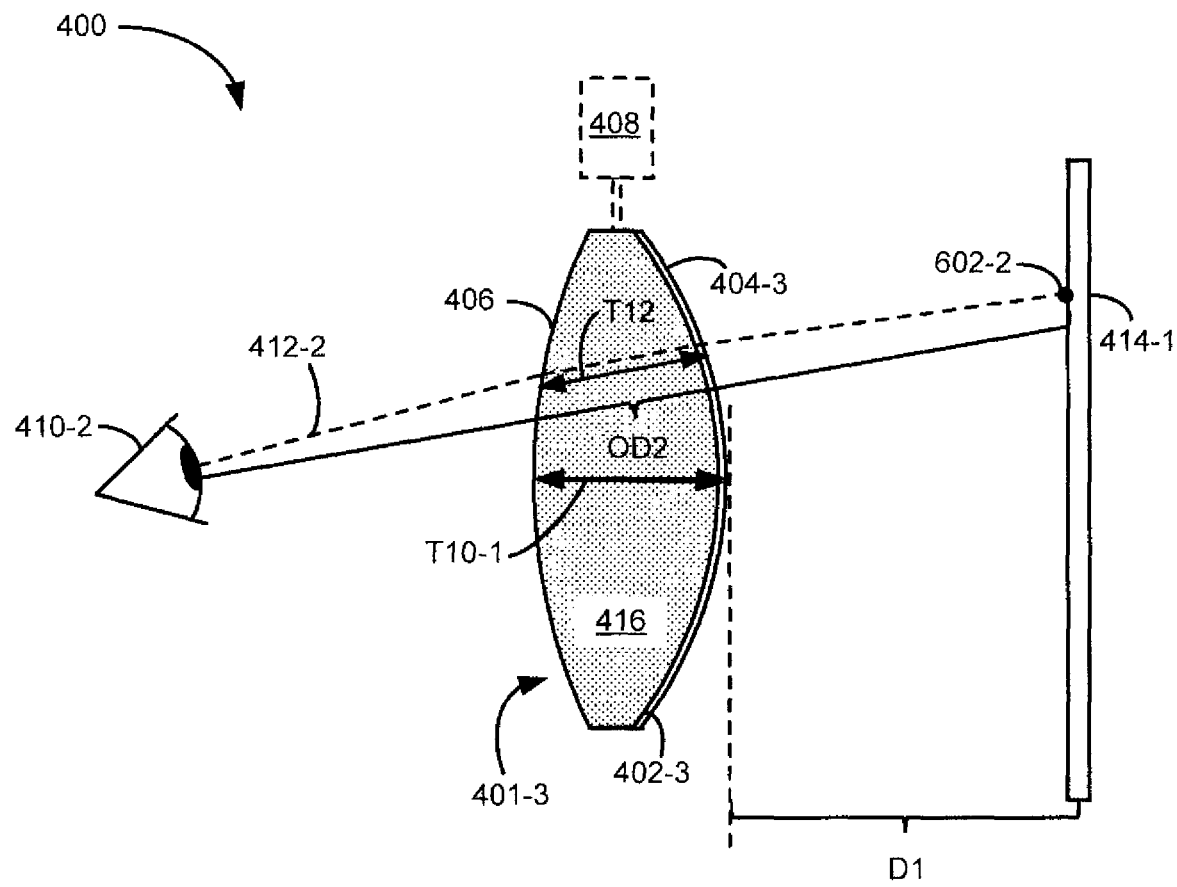

FIGS. 6E-6F are schematic diagrams illustrating adjusting a surface profile of liquid lens 401 for reducing optical distortions in accordance with some embodiments. In FIG. 6E, pupil 410-1 is at a first gaze position and the gaze direction of pupil 410-1, as indicated by ray 412-1 projected by display 414-1 toward pupil 412-1, is along an optical axis of lens 401-1. Display 414-1 is at the first display position, and lens 401-1 is at the first lens position. Lens 401-1 has central thickness T10-1, and membrane 402-1 and patterned film 404-1 have a first surface profile (e.g., a convex surface profile). The distance between display 414-1 and the outermost surface of patterned film 404-1 of lens 414-1 corresponds to distance D1. OD defines an optical distance between reference point 602-1 on display 414-1 and pupil 410-1 at the first gaze position. Optical distance OD is defined as a sum of the products of a geometric length (d) that a path light follows in a medium and the index of refraction of the medium (n), OD=$\Sigma d_x n_x$.

In FIG. 6F, pupil 410-2 is rotated to a second gaze position and the gaze direction has shifted so that ray 412-2, projected from reference point 602-2 on display 414-1, is directed toward pupil 410-2. The position of pupil 410-2 is determined by eye tracking (e.g., with an eye tracking module 217 described above with respect to FIG. 2 and/or an IR detector array 324 described above with respect to FIG. 3). Due to the rotation of the eye, the optical distance between reference point 602-2 and pupil 410-2 may be longer than optical distance OD1 in FIG. 6F, and a user may perceive a distorted image output by display 414 due to the pupil swim effect. In order to reduce this distortion, in response to a determination that pupil 410-2 is at the second gaze position, the surface profile of membrane 402 of lens 401-1 in FIG. 6E has been modified, as indicated with membrane 402-3 of lens 401-3. Membrane 402-3 has a decreased radius of curvature compared to membrane 402-1 of FIG. 6E, i.e., membrane 402-3 has a sharper curvature, while central thickness T10-1 remains constant. Due to the decreased radius of curvature, the thickness of lens 401-3 in the off-axis (peripheral) area of lens 401-3 is decreased, thereby decreasing the geometric distance T12 travelled by ray 412-2 within fluid 416. By adjusting the surface profile and/or thickness of lens 401-3, optical path OD2 between reference point 602-2 and pupil 410-2 can be changed so that optical distance OD2 corresponds to optical distance OD1 in FIG. 6F, even though the physical distance between reference point 602-2 and pupil 410-2 is longer than the physical distance between reference point 602-1 and pupil 410-1 in FIG. 6E. In FIG. 6F, the surface profile of membrane 402-3 and/or thickness of lens 410-3 is adjusted so that an image projected from reference point 602-2 of display 414-1 toward pupil 410-2 is perceived to be at the same distance as an image projected from reference point 602-1 of display 414-1 toward pupil 410-1 in FIG. 6E.

In accordance with some embodiments, an adaptive liquid lens includes a membrane, a patterned film in contact with the membrane, a substrate and a layer of optical fluid encapsulated within the membrane and the substrate (e.g., lens 401 includes membrane 402, patterned film 404 in contact with membrane 402, substrate 406 and optical fluid 416 encapsulated within membrane 402 and substrate 406 in FIG. 4).

In some embodiments, the membrane is made of an optically transparent flexible material (e.g., membrane 402 is made of an optically transparent flexible materials, such as an elastomer in FIG. 4).

In some embodiments, the patterned film is at least partially embedded in the membrane (e.g., Fresnel film 502 is embedded in membrane 402 in FIG. 5A).

In some embodiments, the patterned film includes a plurality of Fresnel structures (e.g., Fresnel film 502 includes a plurality of Fresnel structures in FIG. 5A).

In some embodiments, the patterned film is a holographic film (e.g., holographic film 522 in FIG. 5C).

In some embodiments, the holographic film (e.g., holographic film 522 in FIG. 5C) is made of polycarbonate or poly(methyl methacrylate).

In some embodiments, the holographic film is a Fresnel holographic film (e.g., Fresnel holographic film 512 in FIG. 5B).

In some embodiments, the membrane has a curved surface profile (e.g., membrane 402 has a convex surface profile in FIG. 4).

In some embodiments, the substrate is made of a rigid optically transparent material (e.g., substrate 406 in FIG. 4). In some embodiments, the substrate has a convex shape.

In some embodiments, the adaptive liquid lens defines a range of focal distances, and the adaptive liquid lens is configured to adjust the focal distance within the range of focal distances (e.g., lens 401-1 has a focal distance F1 in FIG. 6A and the focal distance is adjusted to focal distance F2 in FIG. 6C).

In some embodiments, the adaptive liquid lens is configured to adjust the focal distance within the range of focal distances by modifying a surface profile of the membrane (e.g., lens 500-1 in FIG. 5D has a first surface profile and a first focal distance and lens 500-2 in FIG. 5E has a second surface profile and a second focal distance).

In some embodiments, the adaptive liquid lens has a thickness defined by a distance between the substrate and the patterned film along an optical axis of the adaptive liquid lens (e.g., thickness T1 in FIG. 5D). The adaptive liquid lens is configured to modify the surface profile of the membrane without changing the thickness of the adaptive liquid lens (e.g., lenses 500-1 and 500-2 have different surface profiles and the same thickness T1 in FIGS. 5D-5E).

In some embodiments, modifying the curvature of the membrane includes changing the volume of the layer of optical fluid encapsulated within the membrane and the substrate (e.g., lens 500-2 has a smaller volume of fluid 416 in FIG. 5E than lens 500-1 in FIG. 5D).

In some embodiments, a display device (e.g., display device 400 in FIG. 4) includes the adaptive liquid lens described above (e.g., lens 401) and an electronic display (e.g., display 414) optically coupled with the adaptive liquid lens for outputting light through the adaptive liquid lens toward a pupil of an eye of a user of the display device.

In accordance with some embodiments, the electronic display is a varifocal electronic display (e.g., display 414 in FIG. 4).

In some embodiments, a first optical distance is defined between the pupil of the eye of the user at a first position (e.g., pupil 410-1 in FIG. 6E), and a first reference point on the electronic display (e.g., reference point 602-1 in FIG. 6E) and a second optical distance is defined between the pupil of the eye of the user at a second position (e.g., pupil 410-2 in FIG. 6F) distinct from the first position and a second reference point on the electronic display (e.g., reference point 602-2 in FIG. 6F) distinct from the first reference point on the electronic display. The display device is configured to determine a position of the pupil of the eye of the user (e.g., by eye tracking module 217 in FIG. 2 or IR detector array 324 in FIG. 3). The adaptive liquid lens is configured to modify, in response to a determination that the pupil of the eye of the user is at the second position distinct from the first position, a surface profile of the membrane of the adaptive liquid lens (e.g., surface profile of membrane 402-3 is modified in response to a determination that pupil 410-2 is at a second gaze position), thereby changing the second optical distance so that the second optical distance corresponds to the first optical distance (e.g., surface profile of membrane 402-3 is modified so that optical distance OD2 in FIG. 6F corresponds to optical distance OD1 in FIG. 6E).

In some embodiments, the adaptive liquid lens is configured to reduce optical distortions in an image that is output, by the electronic display, to the pupil of the eye of the user at the second position (e.g., FIGS. 6E-6F).

In accordance with some embodiments, a method includes modifying a surface profile of a membrane of an adaptive liquid lens (e.g., FIGS. 5A-5B). The adaptive liquid lens includes the membrane, a patterned film in contact with the membrane, a substrate, and a layer of optical fluid encapsulated within the membrane and the substrate (e.g., FIG. 4). Modifying the surface profile of the membrane of the adaptive liquid lens changes a focal distance of the adaptive liquid lens.

In some embodiments, the adaptive liquid lens is optically coupled with an electronic display (e.g., display 414 in FIG. 4), and a distance between the adaptive liquid lens and the electronic display is adjustable. The method also includes adjusting the distance between the adaptive liquid lens and the electronic display by changing a position of the electronic display with respect to the adaptive liquid lens (e.g., FIGS. 6A-6B). In conjunction with adjusting the distance between the adaptive liquid lens and the electronic display, modifying the surface profile of the membrane of the adaptive liquid lens (e.g., FIGS. 5A-5B).

In some embodiments, the adaptive liquid lens is optically coupled with an electronic display, and a distance between the adaptive liquid lens and the electronic display is adjustable. The method also includes adjusting the distance between the adaptive liquid lens and the electronic display by changing a position of the adaptive liquid lens with respect to the electronic display (e.g., FIG. 6D).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An adaptive liquid lens, comprising:
    a membrane that has a curved surface profile;
    a film in contact with the membrane, wherein the film has a hologram structure to provide an optical power on the membrane with the curved surface profile;
    a substrate; and
    a layer of optical fluid encapsulated within the membrane and the substrate, wherein:
        the adaptive liquid lens is configured to adjust a focal distance by modifying a surface profile of the membrane without changing a thickness of the adaptive liquid lens, the thickness being a distance between the substrate and the film along an optical axis of the adaptive liquid lens.

2. The lens of claim 1, wherein the membrane is made of an optically transparent flexible material.

3. The lens of claim 1, wherein the film is at least partially embedded in the membrane.

4. The lens of claim 1, wherein the film is made of polycarbonate or poly(methyl methacrylate).

5. The lens of claim 1, wherein the film is a Fresnel holographic film.

6. The lens of claim 1, wherein the substrate is made of a rigid optically transparent material.

7. The lens of claim 1, wherein modifying the surface profile of the membrane includes changing a volume of the layer of optical fluid encapsulated within the membrane and the substrate.

8. The lens of claim 1, wherein:
    the modified surface profile corresponds to one of a plurality of predefined surface profiles, the plurality of predefined surface profiles including a first surface profile corresponding to a first convex shape and a second surface profile corresponding to a second convex shape distinct from the first convex shape.

9. The lens of claim 1, wherein the membrane has a non-uniform elasticity across the surface profile.

10. A display device, comprising:
    the adaptive liquid lens of claim 1; and
    an electronic display optically coupled with the adaptive liquid lens for outputting light through the adaptive liquid lens toward a pupil of an eye of a user of the display device.

11. The display device of claim 10, wherein the display device is a varifocal display device.

12. A display device, comprising:
    an adaptive liquid lens including:
        a membrane that has a curved surface profile;
        a substrate; and
        a layer of optical fluid encapsulated within the membrane and the substrate; and
    an electronic display optically coupled with the adaptive liquid lens for outputting light through the adaptive liquid lens toward a pupil of an eye of a user of the display device, wherein:
        a first optical distance is defined between the pupil of the eye of the user at a first position and a first reference point on the electronic display while the membrane has a first curved surface profile;
        a second optical distance is defined between the pupil of the eye of the user at a second position distinct from the first position and a second reference point on the electronic display distinct from the first reference point on the electronic display while the membrane has the first curved surface profile;
        the display device is configured to determine a position of the pupil of the eye of the user; and
        the adaptive liquid lens is configured to modify, in response to a determination that the pupil of the eye of the user is at the second position distinct from the first position, a surface profile of the membrane of the adaptive liquid lens, thereby changing an optical distance defined between the pupil of the eye of the user in the second position and a corresponding reference point on the electronic display from the second optical distance to the first optical distance.

13. The display device of claim 12, wherein:
    the adaptive liquid lens is configured to reduce optical distortions in an image that is output, by the electronic display, to the pupil of the eye of the user at the second position.

14. A method, comprising:
    determining a position of a pupil of an eye of a user of a display device, the display device including an adaptive liquid lens and an electronic display optically coupled with the adaptive liquid lens for outputting light through the adaptive liquid lens toward the pupil of the eye of the user; and
    modifying a surface profile of a membrane of the adaptive liquid lens, the adaptive liquid lens comprising:
        the membrane that has a curved surface profile;
        a substrate; and
        a layer of optical fluid encapsulated within the membrane and the substrate; wherein:
            a first optical distance is defined between the pupil of the eye of the user at a first position and a first reference point on the electronic display while the membrane has a first curved surface profile;
            a second optical distance is defined between the pupil of the eye of the user at a second position distinct from the first position and a second reference point on the electronic display distinct from the first reference point on the electronic display while the membrane has the first curved surface profile; and
            modifying, in response to a determination that the pupil of the eye of the user is at the second position, the surface profile of the membrane of the adaptive liquid lens thereby changing an optical distance defined between the pupil of the eye of the user in the second position and a corresponding reference point on the electronic display from the second optical distance to the first optical distance.

15. The method of claim 14, including:
adjusting a distance between the adaptive liquid lens and the electronic display by changing a position of the electronic display with respect to the adaptive liquid lens; and
in conjunction with adjusting the distance between the adaptive liquid lens and the electronic display, modifying the surface profile of the membrane of the adaptive liquid lens.

16. The method of claim 14, including:
adjusting a distance between the adaptive liquid lens and the electronic display by changing a position of the adaptive liquid lens with respect to the electronic display.

17. The method of claim 14, wherein the adaptive liquid lens includes a film in contact with the membrane, and the film has a hologram structure to provide an optical power while located on the membrane with the curved surface profile.

* * * * *